United States Patent
Imagawa et al.

(10) Patent No.: US 7,392,879 B2
(45) Date of Patent: Jul. 1, 2008

(54) MOTOR-DRIVEN POWER STEERING APPARATUS

(75) Inventors: Harunori Imagawa, Tochigi (JP); Yoshitaka Kubo, Tochigi (JP); Akira Fujisaki, Tochigi (JP)

(73) Assignee: Showa Corporation, Saitama (JP)

( * ) Notice: Subject to any disclaimer, the term of this patent is extended or adjusted under 35 U.S.C. 154(b) by 467 days.

(21) Appl. No.: 11/227,474

(22) Filed: Sep. 15, 2005

(65) Prior Publication Data

US 2006/0219470 A1 Oct. 5, 2006

(30) Foreign Application Priority Data

Mar. 29, 2005 (JP) ............... 2005-096206

(51) Int. Cl.
*B62D 5/04* (2006.01)
(52) U.S. Cl. ...................... 180/444; 180/446
(58) Field of Classification Search .......... 180/444, 180/446, 443; 310/179, 184; 318/254.1
See application file for complete search history.

(56) References Cited

U.S. PATENT DOCUMENTS

| 5,225,729 | A | * | 7/1993 | Yang | 310/206 |
| 5,691,591 | A | * | 11/1997 | McCann | 310/198 |
| 5,866,964 | A | * | 2/1999 | Li | 310/198 |
| 6,938,722 | B2 | * | 9/2005 | Sasaki et al. | 180/444 |

FOREIGN PATENT DOCUMENTS

JP 2000-318627 11/2000

* cited by examiner

*Primary Examiner*—Tony H. Winner
(74) *Attorney, Agent, or Firm*—Orum & Roth LLC

(57) ABSTRACT

In a motor-driven power steering apparatus, the main coil winding and auxiliary coil winding are wound around the same slot of a stator core in a parallel manner, a motor drive means has a main driver feeding at least to the main coil windings, and an auxiliary driver feeding only to the auxiliary coil windings, the main driver being actuated so as to be capable of assisting the steering during normal conditions of a control system of an electric motor, and the auxiliary driver is actuated so as to execute an auxiliary assist corresponding to a motor friction torque under abnormal conditions of the control system of the electric motor.

7 Claims, 4 Drawing Sheets

MOTOR-DRIVEN POWER STEERING APPARATUS

BACKGROUND OF THE INVENTION

1. Field of the Invention

The present invention relates to a motor-driven power steering apparatus.

2. Description of the Related Art

In a motor-driven power steering apparatus, as described in Japanese Patent Application Laid-Open No. 2000-318627 (patent document 1), there is a structure in which rotation of an electric motor is converted into a linear stroke of a rack shaft by a power transmission mechanism. A brushless motor is used as the electric motor during steering assist of a tire wheel connected to the rack shaft. Coil winding is wound around a core slot of a stator core, driving current is supplied to the coil winding by a motor drive means, and the electric motor controls the apparatus to generate a predetermined steering assist force.

A control system of the electric motor has a steering torque sensor detecting a steering torque which the driver inputs to the steering wheel, a vehicle speed sensor detecting a speed of the vehicle, a current sensor detecting a motor current actually flowing through the electric motor, and a rotational position sensor detecting a rotational position of a rotor of the electric motor.

When the steering torque sensor detects the steering torque, a target current is supplied to the electric motor such that the steering torque matches to a target steering torque, and steering operation is assisted on the basis of an output torque of the electric motor. The target steering torque is compensated in correspondence to the vehicle speed detected by the vehicle speed sensor. When supplying the target current to the electric motor, the motor current actually flowing through the electric motor is detected by the current sensor, and a feedback control acts such that a deviation between the actual current and the target current is not generated.

The electric motor has a brushless motor, a stator having plural phases of coil windings, and a rotor having a permanent magnet. It is necessary to sequentially switch the supply of the driving current to exciting phases of the respective coil windings in correspondence to angle of rotation of the rotor (position of magnetic poles of the permanent magnet). Accordingly, the rotational position of the rotor with respect to the stator is detected by the rotation angle sensor.

In the conventional motor-driven power steering apparatus, if abnormality of the sensor is detected in the control system of the electric motor, an assist stop control stopping all feeding to the electric motor is executed. In an assist stop control state, the assist of the electric motor is not applied to the steering system which the driver executes the steering from the input shaft via the rack shaft. Motor friction is applied as a load at the same time when the assist of the electric motor is not generated, and the steering torque of the driver becomes too large.

SUMMARY OF THE INVENTION

An object of the present invention is to reduce steering torque input requirements for a driver even where assist of an electric motor is stopped when any abnormality is generated in a control system of the electric motor, in a motor-driven power steering apparatus.

In accordance with the present invention, there is provided a motor-driven power steering apparatus using a brushless motor as an electric motor. A coil winding around a slot of a stator core supplies a driving current to the coil winding by a motor drive means, when converting rotation of the electric motor into a stroke of a rack shaft by a power transmission mechanism, for assisting steering of a tire wheel connected to the rack shaft. A main coil winding and an auxiliary coil winding are wound around the same slot of the stator core in parallel. The motor drive means has a main driver feeding at least to the main coil winding and an auxiliary driver feeding only to the auxiliary coil winding, the main driver being actuated so as to be capable of assisting the steering under normal control system conditions of the electric motor, and the auxiliary driver is actuated so as to assist control corresponding to a motor friction torque under abnormal control system conditions of the electric motor.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 4A and 4B show a motor drive means, in which FIG. 4A is a block diagram showing an operating state of a main driver, and FIG. 4B is a block diagram showing an operating state of an auxiliary driver.

DESCRIPTION OF THE PREFERRED EMBODIMENTS

Figure 1:
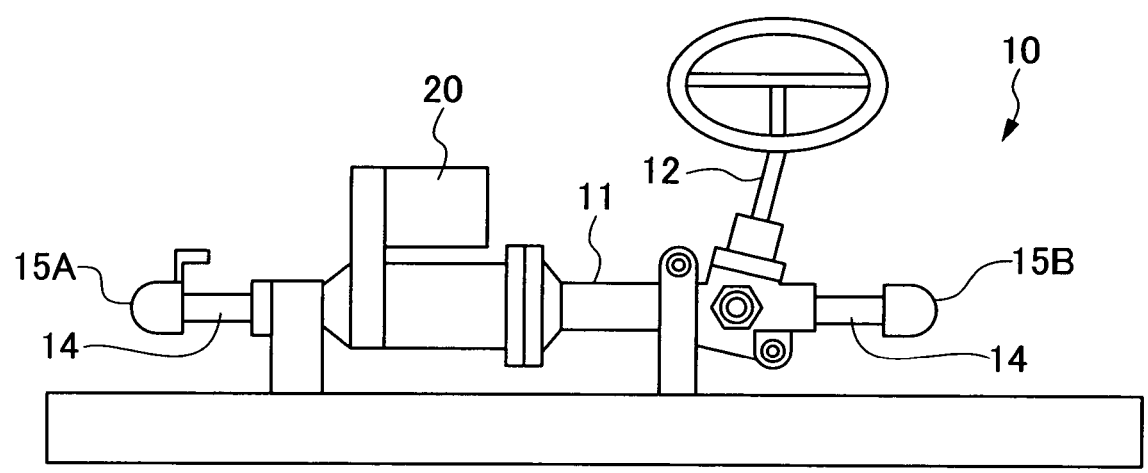
FIG. 1 is a schematic view showing a motor-driven power steering apparatus.
Figure 2:
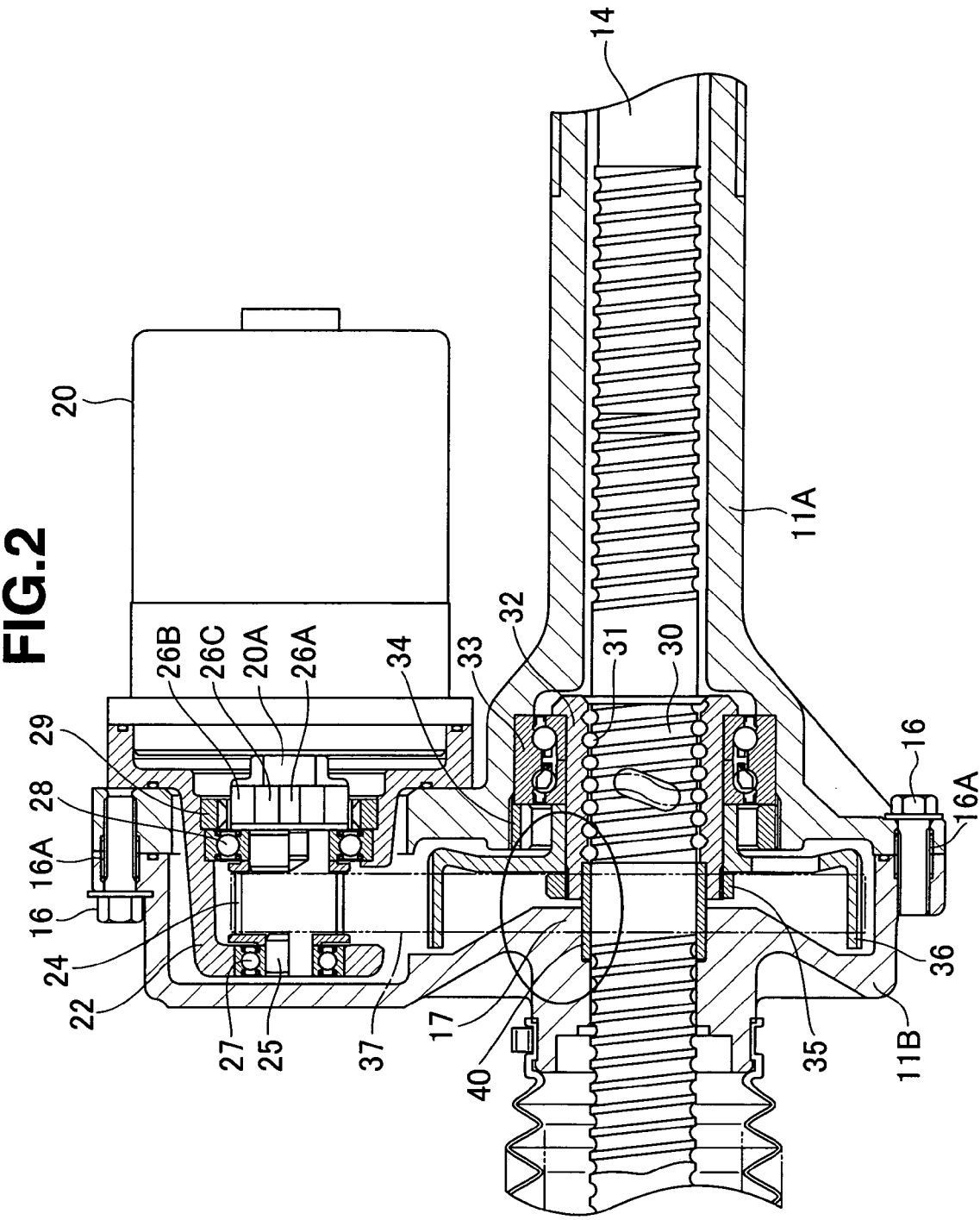
FIG. 2 is a cross sectional view showing a main portion of the motor-driven power steering apparatus.

A motor-driven power steering apparatus 10 is structured, as shown in FIGS. 1 and 2, such that a gear housing 11 is separated into a first gear housing 11A and a second gear housing 11B. A steering input shaft 12 is supported to the gear housing 11 (the first gear housing 11A). An output shaft (not shown) is connected to the input shaft 12 via a torsion bar 13 (not shown). A pinion (not shown) is provided in the output shaft, and a rack shaft 14 engaging with the pinion is supported to the gear housing 11 so as to freely move linearly in a lateral direction. A steering torque sensor 41 is provided between the input shaft 12 and the output shaft. The steering torque sensor detects a steering torque on the basis of a relative rotational displacement amount generated between the input shaft 12 and the output shaft due to an elastic torsional deformation of the torsion bar caused by a steering torque applied to a steering wheel, and outputs a steering torque signal Ts.

The motor-driven power steering apparatus 10 is structured such that both end portions of the rack shaft 14 protrude to both sides of the gear housing 11 (the first gear housing 11A and the second gear housing 11B). Tie rods 15A and 15B are connected to the end portions of the rack shaft 14, and left and right tire wheels can be steered via the tie rods 15A and 15B working with a linear movement of the rack shaft 14.

The motor-driven power steering apparatus 10 is structured, as shown in FIG. 2, such that an electric motor 20 is fixed to a holder 22 by a mounting bolt 21 (not shown). The holder 22 can be attached to and detached from the first gear housing 11A by a mounting bolt 23 (not shown). The holder 22 attached to the first gear housing 11A and inserted to an inner portion of the first gear housing 11A has a fixed gap with respect to inner peripheries of the gear housings 11A and 11B. The holder 22 is allowed to swing with respect to the first gear housing 11A, and can adjust a tensile force of a belt 37 wound around a drive pulley 24 and a driven pulley 36 which are supported to the holder 22 in such a manner as mentioned below.

The holder 22 supports a center shaft 25 of the drive pulley 24, and engages and attaches a joint 26A in a shaft end of a rotating shaft 20A of the electric motor 20 and a joint 26B in a shaft end of the center shaft 25 with each other from an axial direction, pinching an intermediate joint 26C such as a rubber or the like between teeth provided at a plurality of positions in a peripheral direction. In the drive pulley 24, both end portions of the center shaft 25 are supported at both ends to the holder 22 by bearings 27 and 28. Reference numeral 29 denotes a retaining ring for fixing an outer ring of the bearing 28.

The motor-driven power steering apparatus 10 is provided with a ball screw 30 in the rack shaft 14, has a ball nut 32 which is engaged with the ball screw 30 via a ball 31, and rotatably supports the ball nut 32 by a bearing 33 supported to the gear housing 11 (the first gear housing 11A). Reference numeral 34 denotes an outer ring fixing nut of the bearing 33. The driven pulley 36 is fixed to an outer periphery of the ball nut 32 by a lock nut 35.

The motor-driven power steering apparatus 10 is structured such that the belt 37 is wound around the drive pulley 24 in a side of the electric motor 20 and the driven pulley 36 in a side of the ball nut 32. The rotation of the electric motor 20 is transmitted to the ball nut 32 via the drive pulley 24, the belt 37 and the driven pulley 36, and is converted into the linear stroke of the rack shaft 14, thereby linearly moving the rack shaft 14. Accordingly, the electric motor 20 is structured so as to apply a steering assist force to the steering system.

The motor-driven power steering apparatus 10 is structured such that the rack shaft 14 supported to the first gear housing 11A is inserted to the second gear housing 11B, the holder 22 attached to the first gear housing 11A is covered by the second gear housing 11B, and the first gear housing 11A and the second gear housing 11B are fastened by a plurality of coupling bolts 16. The first gear housing 11A and the second gear housing 11B are positioned by a plurality of tubular knock pins 16A, by striking both end portions of the knock pins 16A thereinto, and is thereafter screwed and fastened by the coupling bolt 16 inserted to each of the knock pins 16A, as shown in FIG. 2. One of the coupling bolts 16 is screwed into the first gear housing 11A through the knock pin 16A, and the other of the coupling bolts 16 is screwed into the second gear housing 11B through the knock pin 16A.

The motor-driven power steering apparatus 10 has the following structure for the purpose of making an oscillation of the rack shaft 14 supported to the gear housings 11A and 11B.

In the second gear housing 11B, a portion opposing to the ball nut 32 supported to the first gear housing 11A is formed as a bush support portion 17, and a bush 40 is bridged between the ball nut 32 and the bush support portion 17. The bush 40 is pressure inserted to a leading end side inner peripheral portion of the ball nut 32 so as to be provided in a fixed manner, and supports the rack shaft 14 so as to be linearly slidable in a state of being supported slidably to the inner peripheral portion of the bush support portion 17.

The bush 40 is structured such that a part in an axial direction of an outer periphery of a tube body made of a metal or the like is formed as a slide portion with the bush 17, and an entire portion of the inner periphery is formed as a slide portion with the rack shaft 14. The slide portion is provided by coating a lubricating coating layer such as an oil-contaminated polyacetal resin, a tetrafluoroethylene resin or the like to a surface of the tube body.

The motor-driven power steering apparatus 10 uses a three-phase brushless motor as the electric motor 20. The electric motor 20 is structured such that three-phase coil windings 101, 102 and 103 constituted by three exciting phases u, v and w are respectively wound around a plurality of slots of a stator core, and is provided with a rotor having a permanent magnet. In the electric motor 20, it is necessary to sequentially switch a supply of a motor driving current Im (Imu, Imv and Imw) to the exciting phases u, v and w of the respective coil windings 101, 102 and 103 in correspondence to the angle of rotation of the rotor (the position of the magnetic pole of the permanent magnet). The electric motor 20 has a rotational position detecting sensor 60 detecting the rotational position of the rotor. The rotational position detecting sensor 60 is structured by a resolver, and has a rotor of the resolver fixed to the rotor of the electric motor 20, and a stator of a resolver fixed to the motor housing. Since a predetermined voltage is induced in the stator of the resolver in correspondence to the rotational position of the rotor of the resolver, the rotational position of the rotor, the rotor of the electric motor 20, can be detected by computing an output signal.

Figure 3:
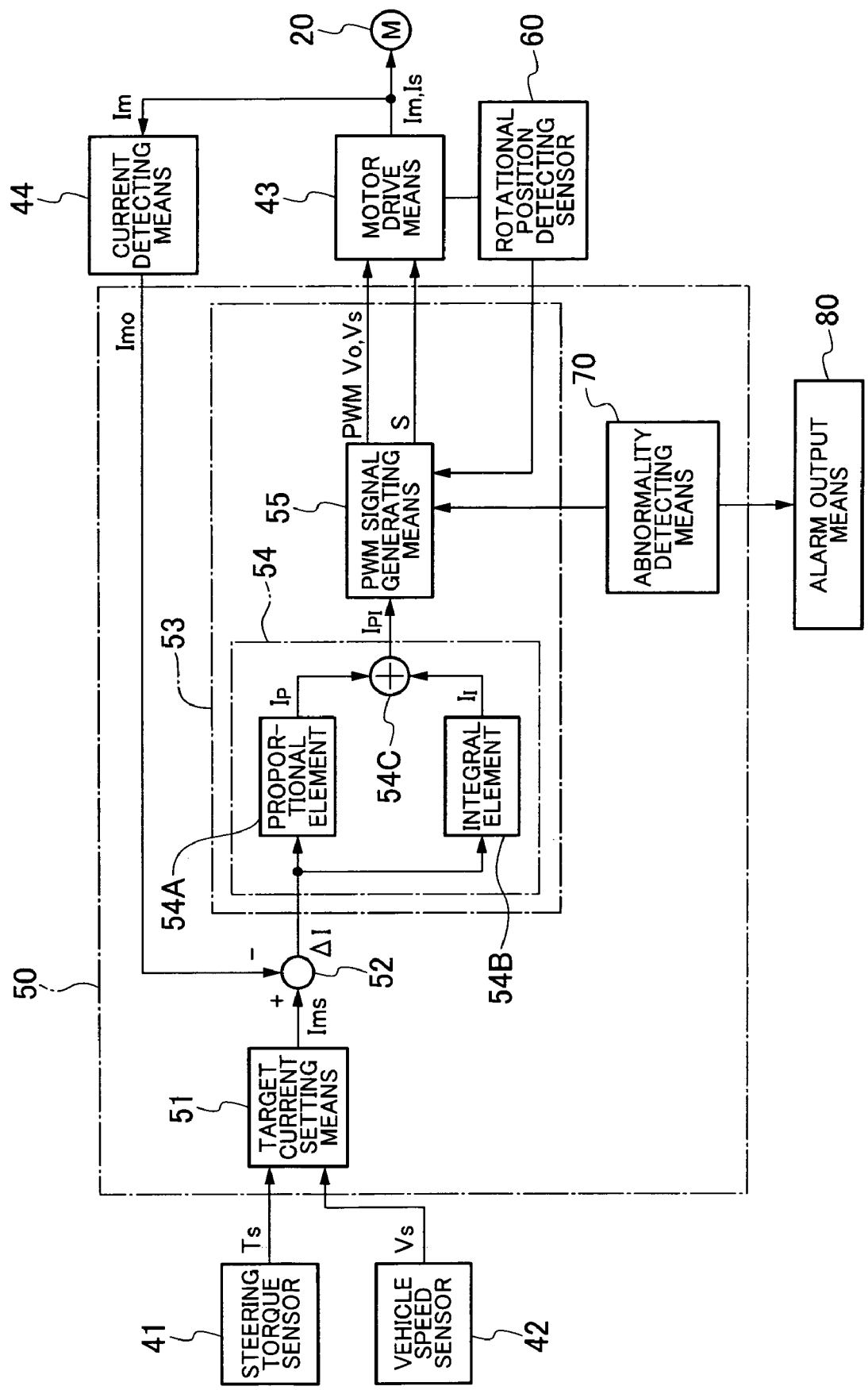
FIG. 3 is a block diagram showing a control system of the motor-driven power steering apparatus.

The motor-driven power steering apparatus 10 has the following control means 50 for the electric motor 20 (FIG. 3).

The control means 50 is additionally provided with a steering torque sensor 41 and a vehicle speed sensor 42. The steering torque sensor 41 detects a steering torque of the steering system and outputs the steering torque signal Ts to the control means 50, as mentioned above. The vehicle speed sensor 42 detects a speed of the vehicle and outputs a vehicle speed signal Vs to the control means 50.

The control means 50 has various arithmetic processing means, signal generating means, memories and the like. A microprocessor generates a drive control signal V0 (three-phase PWM control voltage signals V0$u$, V0$v$ and V0$w$ corresponding to three exciting phases u, v and w of the respective coil windings 101, 102 and 103) to which P (a proportional control) and I (an integral control) are applied on the basis of the steering torque signal Ts and the vehicle speed signal Vs. This controls and drives the motor drive means 43.

The motor drive means 43 is structured by a bridge circuit having a switching element. For example, six power field effect transistors (FET), insulated gate bipolar transistors (IGBT) or the like, generates a motor driving current Im (three-phase alternating driving currents Imu, Imv and Imw) in correspondence to the drive control signal V0. Sequentially, the driving current Im (Imu, Imv and Imw) is supplied to the exciting phases u, v and w of the respective coil windings 101, 102 and 103 of the electric motor 20 in correspondence to the angle of rotation of the rotor of the electric motor 20 detected by the rotational position detecting sensor 60. When the steering wheel is steered in a clockwise direction, the electric motor 20 is, for example, positively rotated so as to apply the steering assist force to the steering system in such a manner that a front wheel is directed in a clockwise direction.

The control means 50 is additionally provided with a current detecting means 44. The current detecting means 44 detects a motor current Im actually flowing through the electric motor 20, and feeds back (negatively feeds back) a detected current signal Imo converted into a digital signal corresponding to the motor current Im to the control means 50.

The control means 50 has a target current setting means 51, a deviation arithmetic processing means 52 and a current control arithmetic processing means 53.

The target current setting means 51 is provided with a memory such as a read only memory (ROM) or the like. A target current signal Ims is read with respect to a steering torque signal Ts obtained by setting the vehicle speed signal Vs to a parameter, from the steering torque signal Ts output by the steering torque sensor 41 and a target current signal Ims map previously stored in the memory on the basis of the steering torque signal Ts and the vehicle speed signal Vs output by the vehicle speed sensor 42. The target current signal Ims is output toward the deviation arithmetic processing means 52.

The deviation arithmetic processing means 52 arithmetically processes a deviation (Ims-Imo) between the target current signal Ims and the detected current signal Imo, and outputs the deviation signal $\Delta I$ to the current control arithmetic processing means 53.

The current control arithmetic processing means 53 applies a PWM signal Vo (V0$u$, V0$v$ and V0$w$) corresponding to a direction, such as a rotational direction of the electric motor 20, polarizing signal and a duty ratio to the motor driving means 43 of the electric motor 20, in correspondence to the deviation signal $\Delta I$ between the target current signal Ims and the detected current signal Imo.

The current control arithmetic processing means 53 has a PI (proportion and integral) control means 54 and a PWM signal generating means 55. In this case, a torque differential control means is added as occasion demands.

The PI control means 54 is provided with a proportional element 54A generating a proportional sensitivity KP so as to execute a proportional control, an integral element 54B generating an integral gain KI so as to execute an integral control, and an adder 54C adding output signals of the proportional element 54A and the integral element 54B. The proportional element 54A and the integral element 54B are connected in parallel. The proportional element 54A outputs a proportional signal IP obtained by multiplying the deviation signal $\Delta I$ by the proportional sensitivity KP, and the integral element 54B outputs an integral signal II obtained by applying an integral process having the integral gain KI to the deviation signal $\Delta I$, respectively to the adder 54C. The adder 54C adds the proportional signal IP and the integral signal II, and outputs a proportional integral signal IPI (IP+II) toward the PWM signal generating means 55.

The PWM signal generating means 55 obtains the detected results of the rotational position detecting sensor 60, and outputs a PWM signal toward the motor drive means 43, according to the angle of rotation of the rotor of the electric motor 20 detected by the rotational position detecting sensor 60. The PWM signal is corresponding to the direction polarity signal and the duty ratio in correspondence to the direction and the magnitude of the proportional integral signal IPI, and also corresponding to the exciting phases u, v and w of the respective coil windings 101, 102 and 103 of the electric motor as the driving control signal V0 (V0$u$, V0$v$ and V0$w$). The motor drive means 43 drives the electric motor 20 on the basis of the motor drive current Im (Imu, Imv and Imw) in correspondence to the driving control signal V0.

Accordingly, the control means 50 executes the following assist control with respect to the electric motor 20 of the motor-driven power steering apparatus 10 in the following manner.

(1) When the steering torque detected by the steering torque sensor 41 is lower than a predetermined value, no steering assist force is required, and the electric motor 20 is not driven.

(2) When the steering torque detected by the steering torque sensor 41 is more than a predetermined value, the steering assist force is required. Accordingly, the electric motor 20 is driven so as to be normally rotated and assist controlled. The rotational force of the electric motor 20 is transmitted to the ball nut 32 via the drive pulley 24, the belt 37 and the driven pulley 36, and forms the steering assist force for executing the linear stroke of the rack shaft 14 via the ball screw 30.

The control means 50 has an abnormality detecting means 70 for detecting an abnormality in a control system of the electric motor 20 such as a sensor abnormality in the steering torque sensor 41 and the vehicle speed sensor 42. The assist control in the item (2) mentioned above is stopped during abnormal conditions, so as to execute the following auxiliary control. The electric motor 20 and the motor drive means 43 are provided with the following structure.

Figure 4A:
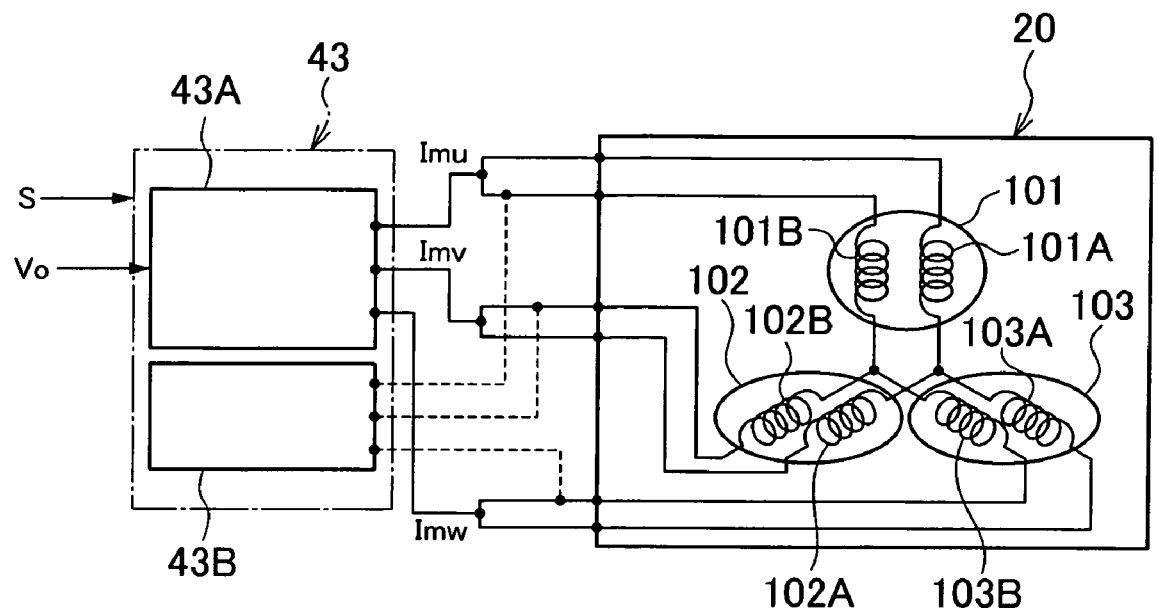
Figure 4B:
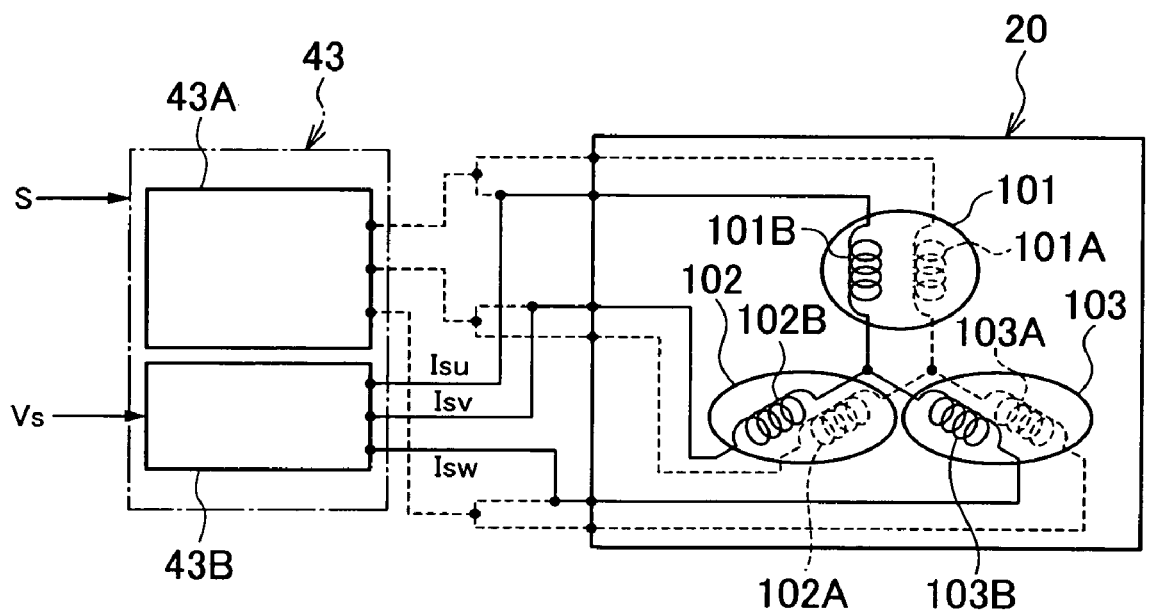

The three-phase coil windings 101, 102 and 103 are wound around each of a plurality of slots of the stator core, as shown in FIG. 4. The electric motor 20 divides the coil winding 101 into a main coil winding 101A and an auxiliary coil winding 101B, divides the coil winding 102 into a main coil winding 102A and an auxiliary coil winding 102B, and divides the coil winding 103 into a main coil winding 103A and an auxiliary coil winding 103B. The main coil winding 101A and the auxiliary coil winding 101B are wound around the same slot in a parallel manner. The main coil winding 102A and the auxiliary coil winding 102B is wound around the other same slot in a parallel manner. The main coil winding 103A and the auxiliary coil winding 103B are wound around the other same slot in a parallel manner.

The motor drive means 43 has a main driver 43A and an auxiliary driver 43B as shown in FIG. 4. The main driver 43A feeds at least to the main coil windings 101A, 102A and 103A. In the present embodiment, the main driver 43A feeds to the main coil winding 101A and the auxiliary coil winding 101B, the main coil winding 102A and the auxiliary coil winding 102B, and the main coil winding 103A and the auxiliary coil winding 103B. The auxiliary driver 43B feeds only to the auxiliary coil windings 101B, 102B and 103B.

Under normal control system conditions of the electric motor 20 at which the abnormality detecting means 70 does not detect any abnormality, the control means 50 actuates the main driver 43A in accordance with a driver selecting signal S (High) which the PWM signal generating means 55 outputs on the basis of the detected result of the abnormality detecting means 70, for the assist control. The main driver 43A generates the motor driving current Im (Imu, Imv and Imw) corresponding to the drive control signal V0 (V0$u$, V0$v$ and V0$w$) which the PWM signal generating means 55 outputs for controlling the steering assist on the basis of the detected result of the steering torque sensor 41 and the vehicle speed sensor 42. The main driver 43A sequentially supplies the driving current Im (Imu, Imv and Imw) to the exciting phase u of the main coil winding 101A and the auxiliary coil winding 101B of the electric motor 20, the exciting phase v of the main coil winding 102A and the auxiliary coil winding 102B and the exciting phase w of the main coil winding 103A and the auxiliary coil winding 103B, by a feeder line shown by a solid line in FIG. 4A, in correspondence to the angle of rotation of the rotor of the electric motor 20 detected by the rotational position detecting sensor 60. In this way, the steering assist is executed.

During abnormal conditions of the control system of the electric motor 20 at which time the abnormality detecting means 70 detects any abnormality, the control means 50 actuates the auxiliary driver 43B in accordance with a driver selecting signal S (Low) which the PWM signal generating means 55 outputs on the basis of the detected result of the abnormality detecting means 70, for stopping the assist control so as to execute the auxiliary control. The auxiliary driver 43B generates the motor auxiliary current Is (Isu, Isv and Isw) corresponding to the auxiliary control signal Vs (three-phase PWM control voltage signals Vsu, Vsv and Vsw corresponding to the exciting phases u, v and w of the respective coil windings 101, 102 and 103) which the PWM signal generating means 55 outputs. The current is generated in such a manner as to resist against a motor friction generated by the assist stop of the electric motor 20 with respect to the steering system which the driver executes the steering from the input shaft 12 via the rack shaft 14. The PWM signal generating means 55 stops the assist control mentioned above, sequentially supplies the auxiliary current Is (Isu, Isv and Isw) to the exciting phase u of the auxiliary coil winding 101B of the electric motor 20, the exciting phase v of the auxiliary coil winding 102B and the exciting phase w of the auxiliary coil winding 103B, by a feeder line shown by a solid line in FIG. 4B, in correspondence to the angle of rotation of the rotor of the electric motor 20 detected by the rotational position detecting sensor 60, thereby canceling the motor friction torque so as to make it possible to steer.

In accordance with the present embodiment, the following operations and effects can be achieved.

(a) The main driver 43A is actuated during normal conditions of the control system of the electric motor 20, and the main driver 43A feeds at least to the main coil windings 101A, 102A and 103A. The main driver 43A supplies the driving current Im defined on the basis of the detected result of the steering torque sensor 41 and the vehicle speed sensor 42 at least to the main coil windings 101A, 102A and 103A, and assist controls in such a manner that the electric motor 20 generates the optimum steering assist force.

(b) During abnormal conditions, when a sensor abnormality or the like is generated in the control system of the electric motor 20, the assist control by the main driver 43A as in the item (a) mentioned above is stopped (fail safe), the auxiliary driver 43B is actuated, and the auxiliary driver 43B feeds only to the auxiliary coil windings 101B, 102B and 103B. The auxiliary driver 43B supplies the auxiliary current Is capable of resisting against the motor friction of the electric motor 20 to the auxiliary coil windings 101B, 102B and 103B, executes the auxiliary control in such a manner that the electric motor 20 generates the auxiliary torque capable of resisting against the motor friction torque, and reduces the manual steering torque by the driver.

(c) Since the main driver 43A simultaneously feeds to the main coil windings 101A, 102A and 103A and the auxiliary coil windings 101B, 102B and 103B when executing the assist control by the main driver 43A in the item (a) mentioned above, it is possible to make the capacity required for the main coil windings 101A, 102A and 103A smaller in comparison with the assist control by feeding only to the main coil winding 101A, 102A and 103A, without reducing a motor efficiency, and it is possible to downsize the electric motor 20.

(d) A stable and smooth rotational motion of the electric motor 20 can be secured in the items (a) to (c) mentioned above, by employing the three-phase brushless motor as the electric motor 20.

In this case, the control means 50 is accessorily provided with an alarm output means 80. The alarm output means 80 outputs an alarm to the driver when the abnormality detecting means 70 detects the abnormality in the control system of the electric motor 20.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the electric motor 20 may accessorily control by means of the auxiliary driver 43A in such a manner as to generate an auxiliary torque corresponding to the motor friction torque and a friction torque of the drive transmission system (including the speed reduction gear).

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus using a brushless motor as an electric motor, having a coil winding around a slot of a stator core and capable of supplying a driving current to the coil winding by a motor drive means, when converting a rotation of the electric motor into a stroke of a rack shaft by a power transmission mechanism, and assisting a steering of a tire wheel connected to the rack shaft, wherein
   a main coil winding and an auxiliary coil winding are wound around the same slot of the stator core in parallel, and
   wherein the motor drive means has a main driver arranged to feed at least to the main coil winding and an auxiliary driver feeding only to the auxiliary coil winding, the main driver being actuatable so as to be capable of assisting the steering under normal conditions of a control system of the electric motor, and the auxiliary driver being actuatable so as to execute an assist control corresponding to a motor friction torque under abnormal conditions of the control system of the electric motor.

2. A motor-driven power steering apparatus as claimed in claim 1, wherein the main driver is arranged to feed to the main coil winding and the auxiliary coil winding.

3. A motor-driven power steering apparatus as claimed in claim 1, wherein the electric motor has a three-phase motor.

4. A motor-driven power steering apparatus as claimed in claim 2, wherein the electric motor has a three-phase motor.

5. A motor-driven power steering apparatus as claimed in claim 1, wherein the motor drive means is structured by a bridge circuit having a switching element, arranged to generate a motor driving current corresponding to a drive control signal, and sequentially to supply the driving current to an exciting phase of each of the coil windings of the electric motor in correspondence to an angle of rotation of a rotor of the electric motor detected by a rotational position detecting sensor.

6. A motor-driven power steering apparatus as claimed in claim 3, wherein the electric motor has the first coil winding divided into a main coil winding and an auxiliary coil winding, the second coil winding into a main coil winding and an auxiliary coil winding, and the third coil winding into a main coil winding and an auxiliary coil winding, when the first to third three-phase coil windings are wound around each of a plurality of slots of the stator core, and wherein the electric motor has the first main coil winding and auxiliary coil winding wound around the same slot in a parallel manner, has the second main coil winding and auxiliary coil winding wound around the other same slot in a parallel manner, and has the third main coil winding and auxiliary coil winding wound further around the other same slot in a parallel manner.

7. A motor-driven power steering apparatus as claimed in claim 4, wherein the electric motor has the first coil winding divided into a main coil winding and an auxiliary coil winding, the second coil winding into a main coil winding and an auxiliary coil winding, and the third coil winding into a main coil winding and an auxiliary coil winding, when winding the first to third three-phase coil windings around each of a plurality of slots of the stator core, and wherein the electric motor has the first main coil winding and auxiliary coil winding around the same slot in a parallel manner, the second main coil winding and auxiliary coil winding around the other same slot in a parallel manner, and the third main coil winding and auxiliary coil winding around further the other same slot in a parallel manner.

* * * * *